July 8, 1941.  E. B. FERNBERG  2,248,224

FASTENER

Filed April 4, 1939   2 Sheets-Sheet 1

Inventor
ERIC BIRGER FERNBERG
by
*Leo Edelson*
Attorney

July 8, 1941.  E. B. FERNBERG  2,248,224
FASTENER
Filed April 4, 1939   2 Sheets-Sheet 2

Inventor
ERIC BIRGER FERNBERG
by
Leon Edelson
Attorney

Patented July 8, 1941

2,248,224

UNITED STATES PATENT OFFICE 2,248,224

FASTENER

Eric Birger Fernberg, Pinner, England, assignor to Ferntol Patents Limited, London, England Application April 4, 1939, Serial No. 266,015
In Great Britain April 11, 1938

9 Claims. (Cl. 24—213)

The present invention relates to fasteners.

It is an object of the invention to provide a fastener for attaching carpets, trim pads, upholstery and the like to members such as the floors, panels and frames of vehicles and so forth, which will be simple to use, efficient in operation and cheap to manufacture.

It is another object of the invention to provide a fastener comprising a snap stud secured to a retainer, neither the stud nor the retainer being secured permanently to either of the members to be fastened.

According to the invention a fastener comprises a stud in the form of a single strip of spring metal bent to substantially U form by bending in one plane only, the limbs of the U being converged to form a neck portion and the ends of the limbs being outwardly turned to form a pair of feet, a washer encircling the neck portion and a hollow button housing said feet and washer.

In order that the invention may be more clearly understood preferred embodiments will now be described with reference to the accompanying diagrammatic drawings in which:

Figures 1 to 3 constitute perspective views of the separated parts of one form of the invention;

Figure 8:
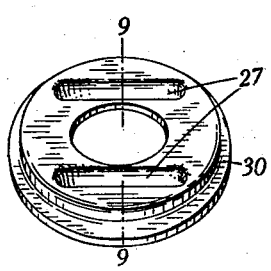
Figure 9:
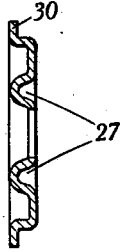
Figure 2:
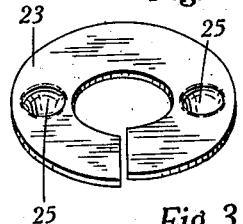
Figure 13:
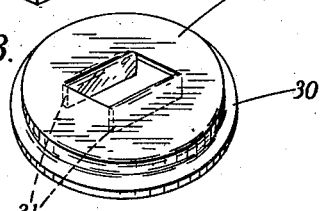
Figure 14:
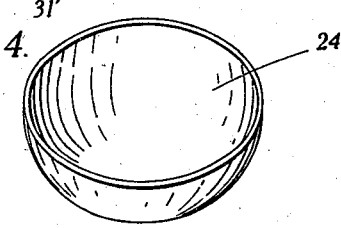
Figure 17:
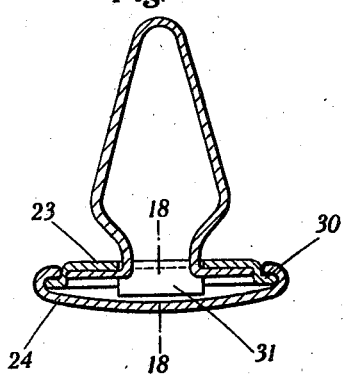
Figure 15:
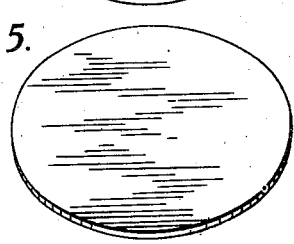
Figure 16:
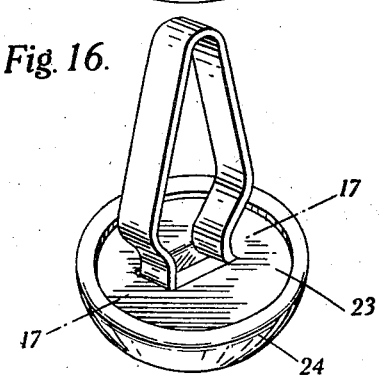
Figure 18:
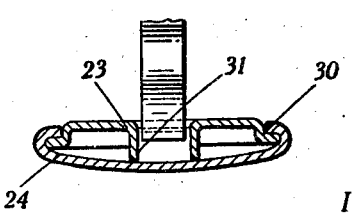

Figures 6 to 11 inclusive show a variety of washers which may be used instead of the washers illustrated in Figures 2 and 13; Figure 9 being a section on the line 9—9 of Figure 8, and Figure 11 being a section on the line 11—11 of Figure 10;

Figures 12 to 15 constitute perspective views of the separated parts of another form of fastener in accordance with the invention;

Figure 16 is a perspective view of the fastener shown in Figures 12 to 15, when assembled;

Figure 17 is a sectional elevation on the line 17—17 of the fastener shown in Figure 16;

Figure 18 is a section on the line 18—18 of Figure 17; and

Figure 3:
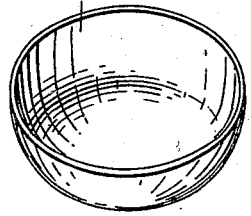
Figure 19:
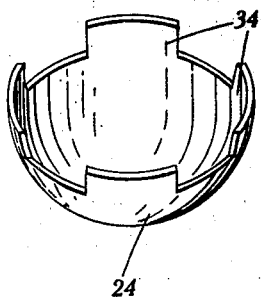

Figure 19 is a perspective view of a modification of the button member shown in Figure 3.

Figure 1:
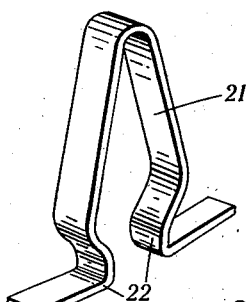

Referring now to Figures 1-5, illustrating a preferred form of fastener, the stud shown in Figure 1 comprises a strip 21 of flat spring steel and is bent to the shape shown. Around the neck portion 22 is placed a washer 23 (Figure 2) formed preferably with a circular aperture. The washer 23 is also split radially as shown and the adjacent edges of the split are separated in a direction perpendicular to the plane of the washer so that the neck portion 22 of the stud can be inserted in the washer. The radial cut and the separation of the edges are effected in one operation. The stud is inserted in the washer 23 by slipping one foot of the stud through the aperture of the washer and compressing and twisting the stud so that the other foot passes between the separated edges of the cut. Thereafter the separated edges can be closed together again if required.

The button member shown in Figure 3 is in the form of a circular shallow cup 24 of metal having cylindrical sides and a base in the form of an inverted shallow dome. The cup 24 is placed base down in a die (not shown) and the stud and washer dropped therein so that the feet and washer rest in the cup. A hollow die (not shown) with an internal conical or dished annular end face is then brought down on to the upturned edge of the cup 24 in such a manner that this edge is pressed inwardly by the die so as to engage the washer and retain the washer and feet within the button member.

The feet of the stud are movable within the cup 24 but neither the feet nor the washer can be removed from the cup, unless the edges of the cut in the washer are left open, or are reopened, when first one and then the other foot can be passed through the separated edges to remove the stud from the head.

The diameter of the circular aperture in the washer 23 is less than the distance between the outer edges of the feet and less than the distance between the widest portions of the U-shaped part of the stud, so that when the stud is compressed or twisted it cannot be withdrawn from the cup. If the aperture in the washer is of rectangular or square shape the same observations as above apply.

In order, however, to allow the feet of the stud to move freely between the base of the cup and the washer, the latter is formed with one or more pips or indentations 25 (Figure 2) or grooves 27 as shown in Figures 8 and 9 which illustrate a modified form of washer. When the washer is assembled within the cup 24 the indentations 25 are disposed between the washer and the base of the cup so that the washer is kept spaced from the cup (see Figure 5) thus allowing the feet of the stud to move freely within the cup. If desired, however, one of the feet may be held fixed and the other left free to move.

The cup may be rectangular or triangular and may be other than dome-shaped as illustrated, for example it may be concave. Similarly, the stud portion of the fastener may differ in unessential details from that described and illustrated.

Figure 6:
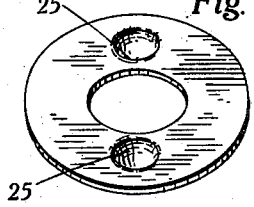

The invention envisages a fastener wherein the washer encircling the neck portion of a metal strip as described is unsplit. Such a washer is shown in Figure 6. The size of the aperture in the washer, shown circular, must be such that the stud can be inserted head first through it, although it is preferable that the feet should not pass through even when the stud is pinched. Alternatively the aperture in the washer may conveniently be a rectangle of ¼" length and width equal or slightly larger than the width of the strip of metal from which the stud is formed.

If desired, one foot of the stud may be shorter than the other, in which case the shorter foot may be held fast within the cup by being pinched between the washer and the cup.

In use studs, according to this form, may be used for attaching a trim pad to the panel of a vehicle, a series of studs being secured in holes formed in the panel. Occasionally the holes in the panel do not register accurately with the holes in the pad, in which case the studs, after being inserted in the panel, lie obliquely of the plane of the pad. In order that the cup or button heads will, under these circumstances, be flat on the pad, it is also preferred to give the feet of the stud a small clearance between the cup and the washer, whether the latter be split or unsplit, so that the cup portion will lie flat on the pad even though the stud is obliquely inclined to the pad. The cup head is in fact self-aligning on the pad.

Figures 6 to 11 inclusive illustrate washers which may be used in conjunction with the stud and cup head above described, or in the modified form about to be described and illustrated in Figures 12 to 18.

The washer shown in Figure 6 is similar to that shown in Figure 2, except that it is unsplit.

Figure 7:
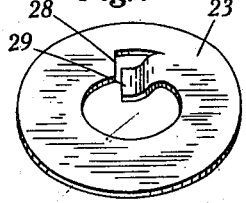

The washer of Figure 7 is formed with an L-shaped cut on the inner side, as shown, one arm 28 of the L being offset radially and the material between the arms of the L being bent as a flange 29 out of the plane of the washer so as to allow the feet of the stud to be inserted by pressing and twisting through the aperture of the washer, after which the flange 29 may be, if desired, flattened again into the plane of the washer.

The washer illustrated in Figures 8 and 9 is formed with the grooves 27 for the purpose specified above and an outwardly turned lip 30 adapted to accommodate the inwardly turned edges of a cup, such as is shown in Figure 2 for example.

In the fastener illustrated in Figures 12 to 18, the washer also has an outwardly turned lip 30, and is made in the form of a shallow cup formed with a rectangular aperture, the longer margins of which are turned down to form flanges 31, which prevent the feet of the stud from twisting. A cup (Figure 4) covered on its outside with fabric material (Figure 15) is placed over the open mouth of the cup-shaped washer, and both the fabric and the cup are turned in and over the lip 30 in such manner that the edge of the fabric is securely gripped between the washer and the cup.

The length of the rectangular aperture in the washer 23, Figure 13, is sufficient to allow the stud to open fully and the depth of the flanges 31 is large enough to bear against, and act as a support to, the head of the cup 24, at the same time sufficient clearance being left for the feet of the stud.

Figure 10:
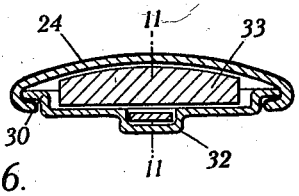
Figure 11:
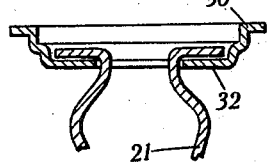
Figure 4:
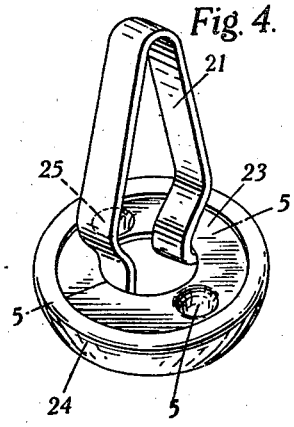
Figure 4 is a perspective view of the fastener shown in Figures 1 to 3, when assembled.
Figure 5:
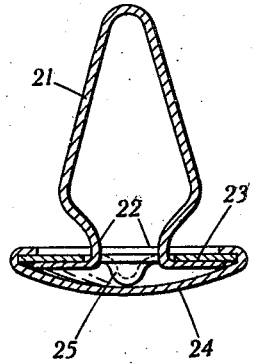
Figure 5 is a sectional elevation on the line 5—5 of the fastener shown in Figure 4.
Figure 12:
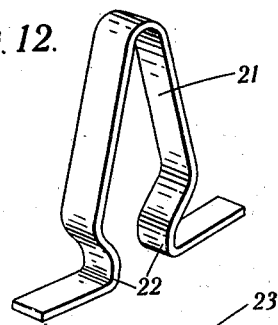

As illustrated in Figures 10 and 11, the feet of the stud are prevented from twisting in the space between the washer and the cup by locating them in a channel-shaped depression 32 formed in the washer. It is preferable that in this form the washer should be unsplit and formed with a rectangular aperture through which the stud is inserted head first until the washer engages the neck of the stud.

In circumstances when the fastener comprises a circular aperture in a cup-shaped washer, a distance piece 33, Figure 10, may be positioned between the feet of the stud and the head of the cup in order to prevent there being too much play between the stud and cup and washer, the feet of the stud being located, in the sideways direction, between the sides of the channel 32 shown in Figure 10.

In Figure 19 is illustrated a cup 24 similar to that shown in Figure 3, except that portions of the rim are cut away to leave lugs 34. This cup may be used in conjunction with the stud 21 of Figure 1 and the washer of Figure 7. The feet of the stud 21 of Figure 1 are inserted into the washer 23 of Figure 7, after which the lugs 34 of the cup 24 are turned over the edges of the washer.

If desired the lugs 34 may be replaced by prongs inserted through holes on the washer of Figure 7 and clenched over, or again the washer of Figure 7 may itself be formed with prongs which can be used to secure the washer to one of the articles to be fastened in which case the hollow cup becomes superfluous.

I claim:

1. A fastener comprising a stud in the form of a single strip of spring metal bent to substantially U form by bending in one plane only, the limbs of the U being converged to form a neck portion and the ends of the limbs being outwardly turned to form a pair of feet, a washer encircling said neck portion, a cup housing said feet and washer, and means providing clearance space between said washer and cup within which the feet of the stud are shiftable relatively to the cup whereby to render the latter self-aligning with respect to the surface to which the fastener is secured.

2. A fastener comprising a stud in the form of a single strip of spring metal bent to substantially U form by bending in one plane only, the limbs of the U being converged to form a neck portion and the ends of the limbs being outwardly turned to form a pair of feet, a washer encircling said neck portion formed with an L-shaped cut, the material of the washer between the arms of the L being bent out of the plane of the washer to allow the feet of the stud to be inserted through the aperture so formed in the washer, and a cup housing said feet and washer.

3. A fastener comprising a stud in the form of a single strip of spring metal bent to substantially U form by bending in one plane only, the limbs of the U being converged to form a neck portion and the ends of the limbs being outwardly turned to form a pair of feet, a washer encircling said neck portion formed with means for attaching it to one of the articles to be fastened and with an L-shaped cut, the material of the washer between the arms of the L being bent out of the plane of the washer to allow the feet of the stud to be inserted through the aperture so formed in the washer.

4. A fastener comprising a stud in the form of a single strip of spring metal bent to substantially U form by bending in one plane only, the limbs of the U being converged to form a neck portion and the ends of the limbs being outwardly turned to form a pair of feet, a washer encircling said neck portion and a cup housing said feet and washer, the washer being formed with a rectangular aperture the margins of the longer sides of which are bent out of the plane of the washer.

5. A fastener comprising a stud in the form of a single strip of spring metal bent to substantially U form by bending in one plane only, the limbs of the U being converged to form a neck portion and the ends of the limbs being outwardly turned to form a pair of feet, a washer encircling said neck portion and a cup housing said feet and washer, said washer being formed with integrally formed means serving to prevent the feet of the stud from turning within the cup and serving to space the washer from the cup.

6. A fastener comprising a stud in the form of a single strip of spring metal bent to substantially U form by bending in one plane only, the limbs of the U being converged to form a neck portion and the ends of the limbs being outwardly turned to form a pair of feet, a washer formed with integrally formed means encircling said neck portion of the stud for restraining the stud against unrestricted rotation relatively to said washer and a cup housing said feet and washer.

7. A fastener comprising a stud in the form of a single strip of spring metal bent to substantially U form by bending in one plane only, the limbs of the U being converged to form a neck portion and the ends of the limbs being outwardly turned to form a pair of feet, a centrally apertured washer encircling said neck portion and provided with parallel elements arranged to either side of the aperture and projecting inwardly of the washer to form a channel within which the feet of the U can freely move lengthwise thereof while restrained against lateral movement, and a cup housing said feet and washer.

8. A fastener comprising a stud in the form of a single strip of spring metal bent to substantially U form by bending in one plane only, the limbs of the U being converged to form a neck portion and the ends of the limbs being outwardly turned to form a pair of feet, a washer encircling said neck portion, a hollow cup housing said feet and washer and a distance piece disposed between the feet of the stud and the cup.

9. A fastener comprising a stud in the form of a single strip of spring metal bent to substantially U form by bending in one plane only, the limbs of the U being converged to form a neck portion and the ends of the limbs being outwardly turned to form a pair of feet, a washer encircling said neck portion, a hollow cup housing said feet and washer, and means disposed in intervening relation between said cup and washer to separate the same and at the same time loosely confine said feet within the hollow cup to permit free movement of the U angularly with respect to the cup.

ERIC BIRGER FERNBERG.